May 4, 1965     R. H. DUTTON ETAL     3,182,308
COMPOSITE DISPLAY SYSTEM
Filed Dec. 29, 1961     2 Sheets-Sheet 1

INVENTORS
RICHARD HUGH DUTTON
JAMES C. CLEMENTS
ROBERT J. BEAIRSTO
ROBERT D. STODDARD
BY
AGENT

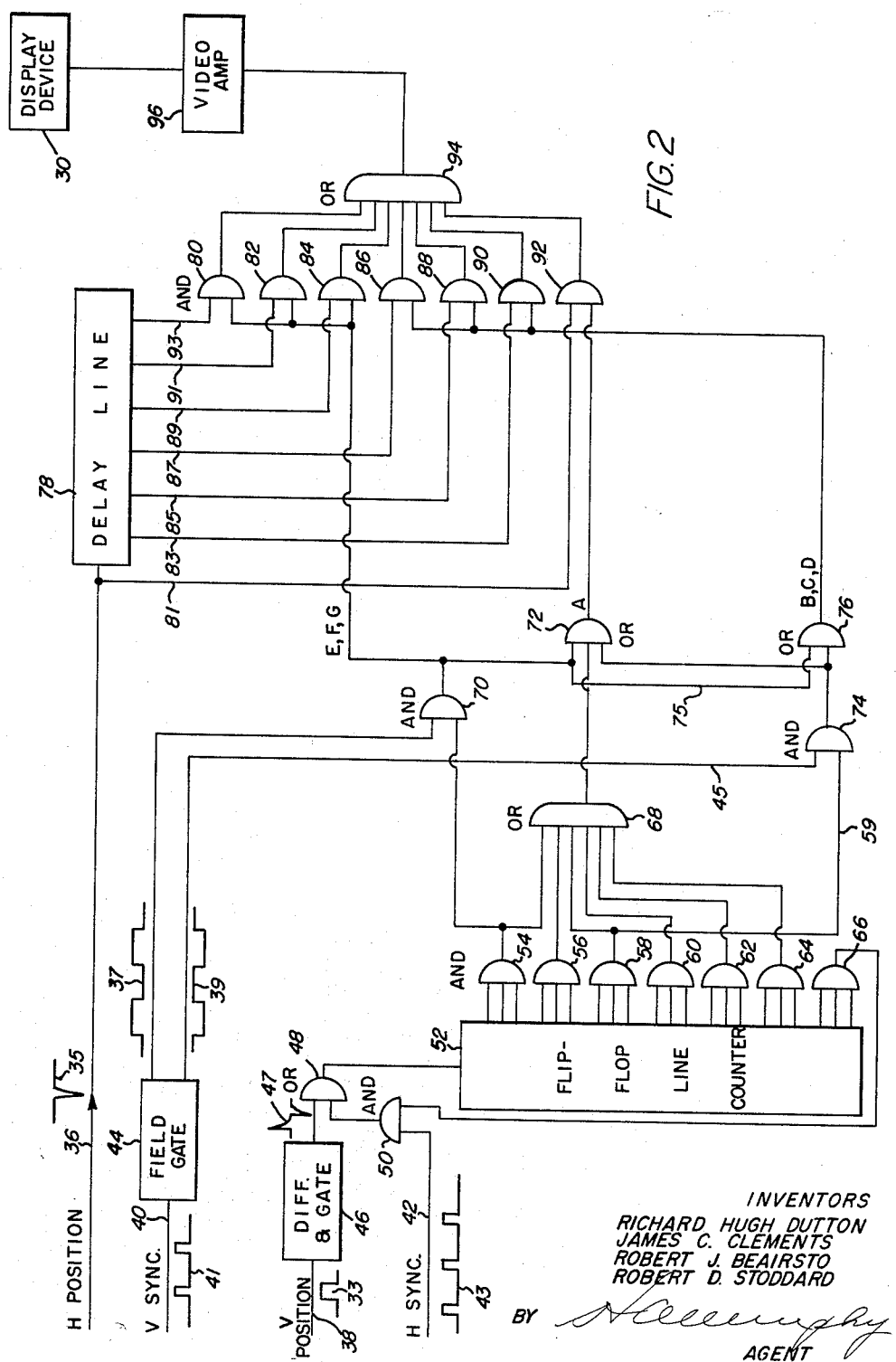

United States Patent Office 3,182,308
Patented May 4, 1965

---

3,182,308
COMPOSITE DISPLAY SYSTEM
Richard Hugh Dutton, Holliston, James C. Clements, Sudbury, and Robert J. Beairsto, Auburn, Mass., and Robert D. Stoddard, Merrimack, N.H., assignors to Raytheon Company, Lexington, Mass., a corporation of Delaware
Filed Dec. 29, 1961, Ser. No. 163,311
3 Claims. (Cl. 343—5)

This invention relates to a composite display device and, more particularly, to an arrangement for the simultaneous composite display of both alpha-numeric and video information.

There are many techniques devised in the prior art for producing a simultaneous composite of alpha-numeric characters with a video display. One of these schemes involves the use of a beam which is projected through a template which has characters cut thereon to form the character member. The beam is caused to impinge on a fluorescent screen and the character formed thereon is "read" by another device such as a Vidicon or Image Orthicon and the output thereof is combined with the video.

Still another scheme involves the use of a card with a character printed thereon which is read by a Vidicon and combined with a video.

These schemes have obvious drawbacks in that they require two reading tubes; also two scanning systems.

In, for example, an airport surveillance system or on any plotting board, as aircraft approach a landing area, it is necessary for the airport operator to program the take-off and landing of the aircraft. It is also very important that he be able to identify planes that are airborne, and to rapidly and accurately plot their course of flight through the radar field of vision. It has become an important part of airport surveillance systems to have each plane identified by either a number or letter or symbol or any combination thereof. In this manner, as the plane's course is tracked by means of the radar equipment, an auxiliary device provides a means of identifying each plane.

To use any of the prior art devices would, therefore, necessitate bulky equipment and separate systems for each plane that appears on the radar screen.

Our invention contemplates the utilization of the sweep scans which are normally present in a raster-type of display to act as trigger pulses for our symbol generator with means for independently determining the location on the raster at which the symbol will appear.

It is, therefore, one object of the present invention to provide an improved composite display system.

Another object of the present invention is to provide a composite display system which is relatively compact.

Still another object of the present invention is to provide an integrated composite display system which does not require separate scanning means.

The features of our invention which we believe to be novel are set forth with particularity in the appended claims. The invention itself, however, both as to its organization and method of operation, together with further objects and advantages thereof, may be best understood by reference to the following description, taken in conjunction with the accompanying drawings in which:

FIG. 2 is illustrative of one embodiment of a symbol generator having particular applicability to our radar system;

*Generation of a symbol*

While it has been shown that there are various methods of generating and displaying characters such as numbers, letters, symbols, or any combination thereof, it has been found that the best method of displaying the generated signals on the screen of a raster-type display device is without interrupting the normal presentation of target information and by utilizing the scan system which produces the raster to accurately time the symbol presentation.

Basically, the symbol generation operates by counting in both the horizontal and vertical planes from a point designated by a pair of start pulses which may, for example, originate at an horizontal row and vertical column positioning device. The position of the symbol is usually determined by an operator. In this manner, the operator may continuously change the position at which the symbol appears so that it is always maintained in close proximity to any given target presentation and, thereby, provides a means of identifying the target.

A count of 5 in the horizontal plane and a count of 7 in the vertical plane produces a rectangular pattern of 35 points of intersection at which coincidence is established in a fixed or regular order by means of a matrix. If the vertical columns were designated with the letters A–E, inclusive, and the horizontal rows were designated with the figures 1–7, inclusive, a matrix would thereby be produced (note FIG. 3).

The order in which the coincidence is established is then $A_1$, $B_1$, $C_1$, $D_1$, $E_1$, $A_2$, $B_2$, etc. until we reach the lowest row which would be $A_7$, $B_7$, $C_7$, $D_7$, and $E_7$. If, now, the spaces between each horizontal line represents one raster line and the spacing between the vertical lines is in the order of 0.1 $\mu$sec., it will be seen that a dot matrix is produced, equivalent in size to a rectangle approximately ¼ inch square when utilized with a 17 inch diameter screen operating on a 945 line bright display system. By selecting an appropriate order of dots, any one of a number of symbols may be constructed.

Figure 3:
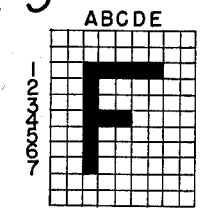
FIG. 3 is illustrative of a 5 x 7 symbol.

Thus, if the letter "F" of FIG. 3 were to be produced, it will be seen that all of the columns in row 1 are energized on the first raster line; only the first column is energized on the second and third raster lines. The first three columns are energized on the fourth raster line and the first column only is energized on the fifth, sixth, and seventh raster lines. The wave form resulting from this selection of dots may then be fed to a display device and mixed with the normal video input to the video display device.

Figure 6:
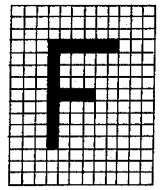
FIG. 6 is illustrative of a 6 x 9 symbol.

FIGS. 3 and 6 illustrate how the letter "F" can be presented in squares using a 5 x 7 and 6 x 9 display, respectively.

Figure 4:
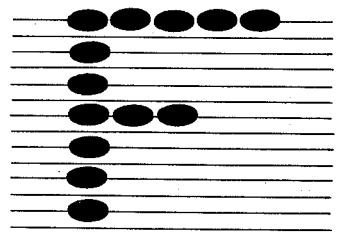
FIG. 4 is illustrative of a 5 x 7 symbol written once each TV frame.
Figure 5:
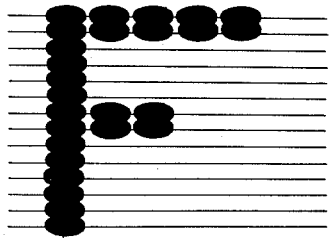
FIG. 5 is illustrative of a 5 x 7 symbol written twice each TV frame or once each TV field.

On a display where 5 x 7 symbols are composed of light spots, the letter will appear as shown in FIG. 4 if the symbol is written once each TV frame. If the symbol is written once each TV field (that is, twice each TV frame) the lines of the two fields of the frame will be interlaced, as shown in FIG. 5.

Figure 7:
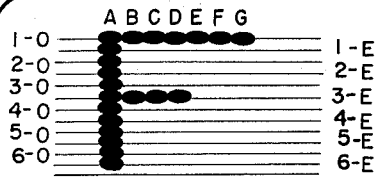
FIG. 7 is illustrative of a 7 x 12 symbol written by interlacing each TV field.

FIG. 7 shows the letter "F" as a 7 x 12 symbol written once each field (twice each frame, i.e., lines 1–0, 2–0, 3–0, 4–0, 5–0, and 6–0 on the first field and lines 1–E, 2–E, 3–E, 4–E, 5–E and 6–E on the second field).

*System operation*

Figure 1:
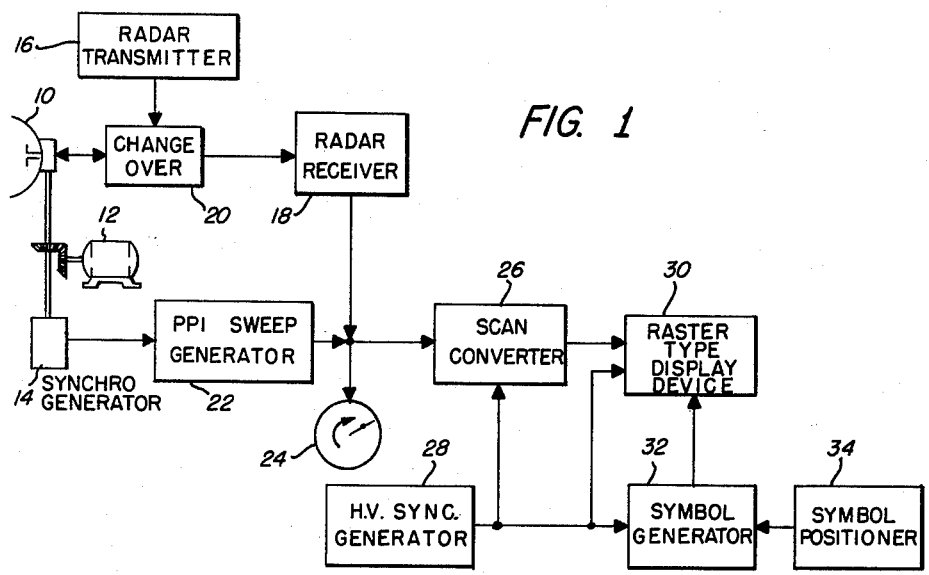
FIG. 1 illustrates, in block diagram form, a radar system embodying the principles of our invention.

Referring now to FIG. 1 for the illustration of this novel invention, there is shown an antenna 10 adapted to be rotated by a motor 12 and mounted at a radar installation such as an airport surveillance station or a radar-equipped base. A bearing signal, indicative of the instantaneous bearing or position of the antenna is generated by a synchro-generator 14. A pulsed radar transmitter 16 and a radar receiver 18 are connected through a suitable transmit-receiver switch or antenna change-over device 20 to the antenna 10. The bearing signal generated by synchro-generator 14 is applied as an input to a sweep generator 22 for subsequent utilization in a Plan Position Indicator (PPI) display device 24. The output of the radar receiver 18 is also applied as an input to the display device 24, which then presents the usual PPI presentation. The combined video from radar receiver 18 and the PPI sweep information from generator 22 is also applied as an input to scan converter 26. This scan converter 26 converts the information which is applied to the PPI in $\rho$, $\theta$ form and presents an output thereof in a form suitable for presentation on a raster-type display device 30. That is, successive horizontal lines are scanned and the video information is made to modulate the beam.

To do this, it will be necessary to generate horizontal and vertical synchronizing signals by means of a synchronizing generator 28 which will accurately determine the occurence of the individual horizontal lines that go to make up the raster.

To accomplish the purpose of our invention, a symbol is generated by means of symbol generator 32 utilizing the horizontal and vertical synchronizing pulses initially generated for the scan converter 26 and the raster-type display device 30. In addition, the vertical and horizontal position of the symbol may be varied to appear anywhere on the raster by means of symbol positioner 34.

Referring now to FIG. 2, there is depicted schematic and block diagram representation of one form of matrix which is suitable for generation of a symbol in the novel system of FIG. 1. To accomplish this result, the horizontal positioning information from the symbol positioner 34 is applied as an input on line 36 and is represented by a negative spike 35. Vertical information is applied as an input on line 38 and is usually represented by a positive going square wave 33. The horizontal positioning spike 35 determines where the symbol information appears on the horizontal line after the beam has been unblanked, while the positive going square wave 33 representing the vertical position information determines on which line of the 945 lines comprising the raster frame the symbol will begin to appear.

The first thing which will have to be determined is the line on which the symbol begins to appear. Therefore, the vertical positioning information square wave is fed through a differentiator and gate circuit 46 to differentiate the input square wave 33 to produce the spiked signal 47.

In this instance, only the positive portion of the signal is utilized and is fed through a "or" gate 48 and into a flip-flop line counter 52. This initial pulse serves to start the counting process and a start pulse appears at "and" gate 66, the output of which is a positive going start pulse to "and" gate 50. Thus, the positive going horizontal synchronizing pulses 43 from synchronizing generator 28 (FIG. 1), appearing on line 42, are presented as an input to "and" gate 50 and are passed to "or" gate 48 due to the presence of the start pulse from "and" gate 66. Now the first horizontal synchronizing pulse that passes through "and" gate 50 and then through "or" gate 48 to line counter 52 energizes "and" gate 54. This now passes a pulse through "and" gate 54 and also through "or" gate 68. The pulse applied to "or" gate 68 is also applied to "and" gate 70. "And" gate 70 has been appropriately biased to pass signals during that time that the odd field produces lines. This biasing is accomplished by applying video synchronizing information, as represented by the wave form 41, to line 40. Field gate 44 produces wave forms 37 and 39 which are then representative of the odd and even numbered fields, respectively. The field signal 39, representing the even numbered lines, is then applied to "and" gate 74, while the field signal 37, representing the odd numbered lines, is applied to "and" gate 70.

The pulse that was passed through "or" gate 68 is also passed through "or" gate 72. When the pulse has passed through "and" gate 70, it is also applied to and through "or" gate 76 via connection 75.

"And" gates 92, 90, 88, 86, 84, 82, and 80 represent, respectively, positions A, B, C, D, E, F, and G of FIG. 7. Thus, by reason of the interconnection shown, the output of "or" gate 72 will always produce a spot at position A (gate 92), while the output of "and" gate 70 will always produce a spot at positions E (gate 84), F (gate 82), and G (gate 80) while the output of "or" gate 76 will always produce a spot at positions B (gate 90), C (gate 88), and D (gate 86).

The pulses which will represent the spots must now be produced somewhere along the horizontal line and this is accomplished by means of the horizontal position information applied to line 36 in the form of a negative going spike 35. Wave form 35 is applied to delay line 78 which suitably delays the signal and the appropriately delayed signals appear on lines 81, 83, 85, 87, 89, 91, and 93 and applied to "and" gates 92, 90, 88, 86, 84, 82, and 80, respectively. This appropriately successively biases "and" gates 80-92 to pass the signals to "or" gate 94 and subsequently to video amplifier 96 (if necessary) and then to the display device 30. Thus, it has been shown that on line 1 of the odd field bright spots have been displayed on the raster, as shown in FIG. 7, at positions A, B, C, D, E, F, and G.

For the remaining lines generated which represent the odd field, "and" gate 50 is held open; that is, the output of "and" gate 66 holds "and" gate 50 open for six lines. Therefore, the next horizontal synchronizing pulse representing the second symbol line (2–0 of FIG. 7) passes through "and" gate 50 and through "or" gate 48 to flip-flop line counter 52 to produce a pulse at "and" gate 56, which is then passed through "or" gate 68, through "or" gate 72, to appear at "and" gate 92. Therefore, on line 2–0 (odd) a spot only appears in column A.

Similarly, during the generation of line 3–0, "and" gate 58 is energized to pass a signal which will subsequently produce a spot only on line 3–0 at position A. It should be here noted that when "and" gate 58 is energized and passes a signal to "or" gate 68, the same signal is applied, via connection 59, to "and" gate 74. However, during this interval, wave form 39 has appropriately biased "and" gate 74 so that no signals are passed therethrough. Similarly, "and" gate 60 is utilized to produce a spot on line 4–0 at position A, "and" gate 62 is utilized to produce a spot at position A on line 5–0, while "and" gate 64 produces a spot on line 6–0 in column A.

The next horizontal synchronizing pulse (the seventh symbol pulse) applied to counter 52 serves to produce a negative output signal from "and" gate 66. This negative pulse serves to inhibit "and" gate 50 to prevent any further horizontal synchronizing pulses from being passed through "and" gate 50 until the next succeeding vertical position pulse (33) starts the counting process for the even field in the same manner as previously described with regard to producing lines in the odd field.

The same procedure is repeated for line 1–E and 2–E where a spot will only appear in column A. However, in line 3–E, it is necessary to generate a spot at positions A, B, C, and D. This is accomplished in much the same manner as previously described. In this last instance, the horizontal synchronized pulse wave form 43 is applied through line 42, through "and" gate 50, and through "or" gate 48 to line counter 52, where a pulse appears at "and" gate 58. It should be noted that the pulse that passes through "and" gate 58 to be applied to "or" gate 68 is also applied, via line 59, to "and" gate 74. It should also be noted that the vertical synchronizing pulse 41 has been broken down by field gate 44 into wave forms 37 and 39. Wave form 39 is applied through line 45 to "and" gate 74 so that signals will appear at positions B, C, and D during the generation of the lines representing the even field. The output of "and" gate 58, which has been applied to "or" gate 68, has passed therethrough to "or" gate 72 and will represent the spot appearing on position A. Thus, for line 3 in the even field, spots have been generated for positions A, B, C, and D.

In the same manner as previously described, "and" gates 60, 62, and 64 will generate the spot which will appear only in column A for lines 4E, 5E, and 6E, respectively.

While there has been described what is presently considered a preferred embodiment of the invention, it will be obvious to those skilled in the art that various changes and modifications may be made therein without departing from the inventive concept contained therein, and it is, therefore, aimed in the appended claims to cover all such changes and modifications as fall within the true spirit and scope of the invention.

What is claimed is:

1. In combination:
    a symbol generator for producing a given symbol in the form of a matrix;
    a display device;
    a beam sweep system for generating synchronizing signals;
    a source of video information means applying video information from said source to the display device for presentation thereon;
    means applying the synchronizing signals to the display device for generating a raster thereon;
    means simultaneously applying the synchronizing signals to the symbol generator, and
    means interconnecting the symbol generator with the display device to display a composite video and symbol presentation on the display device.

2. A composite display system comprising in combination:
    a radar receiver having an input and output;
    an antenna coupled to the input of the radar receiver;
    a converter connected to the output of the receiver, the output of the converter being applied to a display device;
    means generating synchronizing pulses;
    means applying the synchronizing pulses to the display device for generating a raster thereon;
    a symbol generator;
    means applying the synchronizing pulses to the symbol generator for generating a symbol, and
    means applying the generated symbol to the display device.

3. A composite display system comprising in combination:
    a radar receiver having an input, an output, and an antenna connected to the input;
    means rotating the antenna;
    means connected to the antenna for generating a bearing signal indicative of the instantaneous position of the antenna;
    means applying the bearing signal to a first sweep generator for generating a first scanning signal;
    means combining the first scanning signal and the receiver output to derive a first presentation signal comprising a combined video and first scanning information signals;
    means generating a second scanning signal having horizontal and vertical synchronizing pulses;
    means applying the first presentation signal and the horizontal and vertical synchronizing pulses to a converter for converting the first presentation signal to a second presentation signal comprising the video information and second scanning information signals;
    means applying the second presentation signal to a display device;
    a symbol generator;
    means applying the horizontal and vertical synchronizing pulses as an input to the symbol generator to generate a signal representing the symbol at the output of the symbol generator, and
    means applying the signal representing the symbol to the display device to present a composite video and symbol presentation on the display device.

References Cited by the Examiner
UNITED STATES PATENTS

| | | | |
|---|---|---|---|
| 2,622,240 | 12/52 | Fleming-Williams | 343—5 |
| 2,774,964 | 12/56 | Baker et al. | 343—6 |
| 2,775,757 | 12/56 | Ellsworth et al. | 343—5 |
| 2,858,531 | 10/58 | Stocker | 343—5 |
| 2,920,312 | 1/60 | Gordon et al. | |
| 2,938,949 | 5/60 | Vosburgh et al. | 343—5 |

CHESTER L. JUSTUS, *Primary Examiner.*